(No Model.) 3 Sheets—Sheet 1.

G. B. DAVISON.
CULTIVATOR.

No. 467,660. Patented Jan. 26, 1892.

WITNESSES:
C. L. Bendixon
H. M. Seamans

INVENTOR
George B. Davison
By Dudley, Laass & Dudley
his ATTORNEYS.

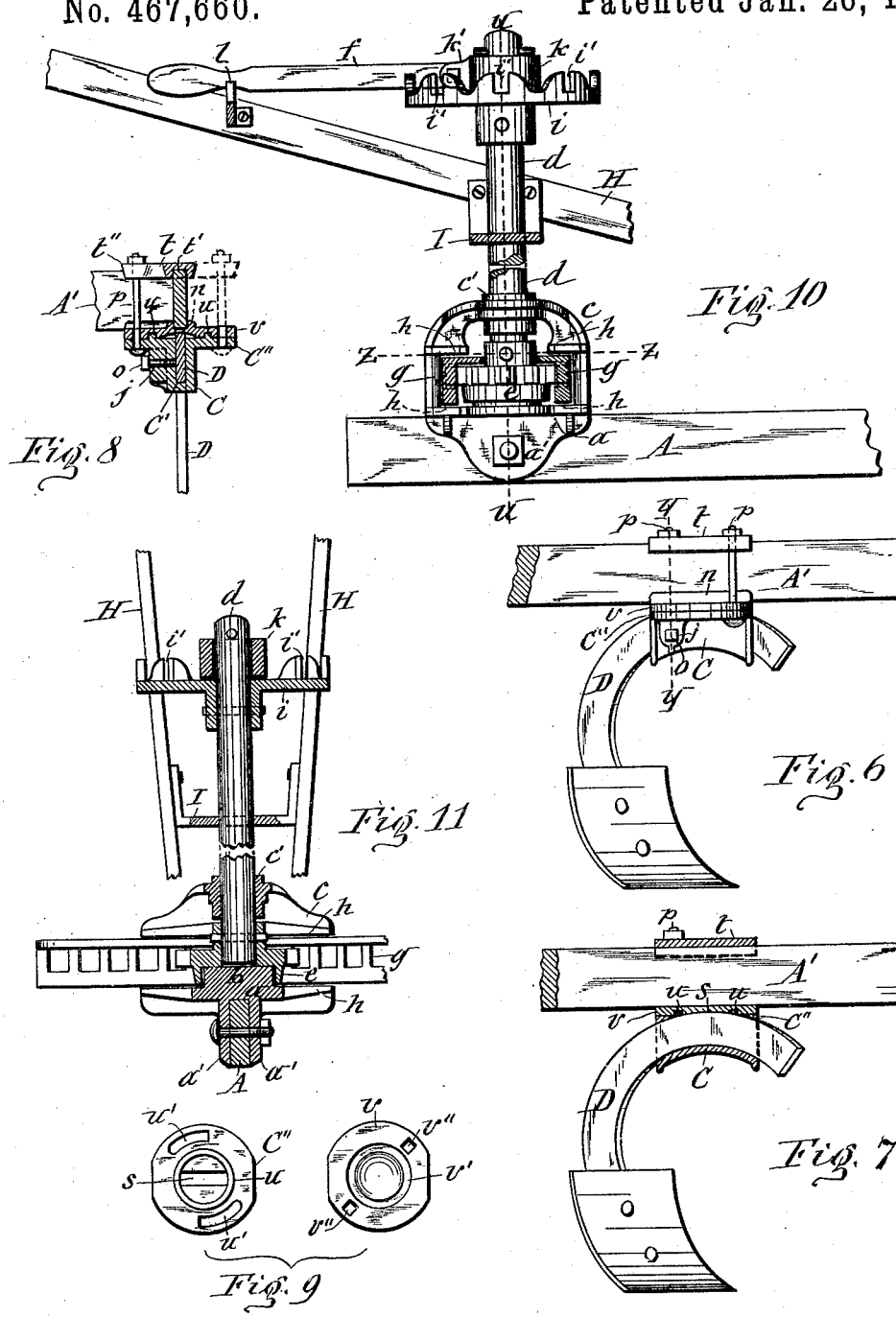

(No Model.)

3 Sheets—Sheet 3.

G. B. DAVISON.
CULTIVATOR.

No. 467,660.

Patented Jan. 26, 1892.

WITNESSES:
C. L. Bendixon
H. M. Seamans

INVENTOR:
George B. Davison
By Duell, Laass & Duell
his ATTORNEYS.

UNITED STATES PATENT OFFICE.

GEORGE B. DAVISON, OF UTICA, NEW YORK, ASSIGNOR TO THE EUREKA MOWER COMPANY, OF SAME PLACE.

CULTIVATOR.

SPECIFICATION forming part of Letters Patent No. 467,660, dated January 26, 1892.

Application filed February 27, 1891. Serial No. 383,034. (No model.)

*To all whom it may concern:*

Be it known that I, GEORGE B. DAVISON, of Utica, in the county of Oneida, in the State of New York, have invented new and useful Improvements in Cultivators, of which the following, taken in connection with the accompanying drawings, is a full, clear, and exact description.

This invention relates to the attachment of the cultivator-teeth to the cultivator-frame, and also relates to the adjustment of the side draft-bars laterally toward and from the line of draft to vary the width of the cultivator as may be desired.

The object of the invention is to obtain greater range and accuracy of adjustment of the position of the teeth on the cultivator-frame in relation to the line of draft as well as to their angle of inclination, and to allow the teeth to be attached to the frame at any point in the length thereof and to effect said attachment and adjustment without necessitating bending and perforating and thus weakening the draft-bars, and consequently also obviating the expense of drilling bolt-holes in said bars; and the object of the invention, furthermore, is to facilitate the adjustment of the rear ends of the side draft-bars toward and from the line of draft to vary the width of the cultivator-frame; and to that end the invention consists in the novel construction and combination of parts hereinafter fully described, and specifically set forth in the claims.

Figure 1:
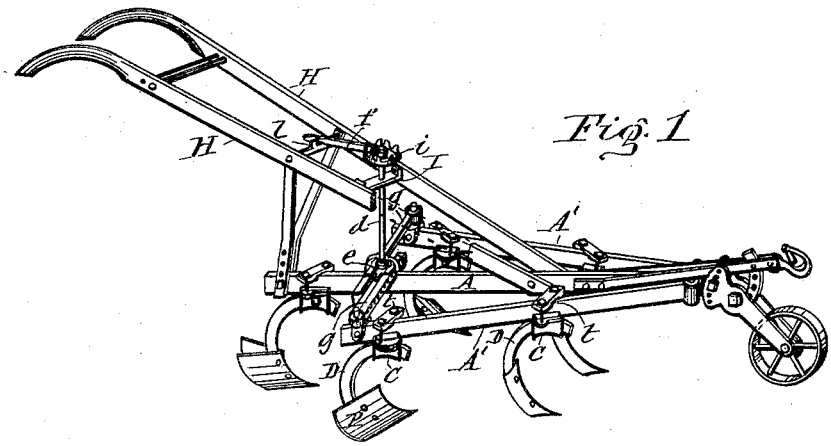
Figure 2:
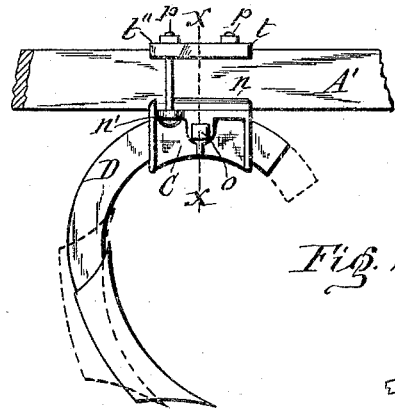
Figure 5:
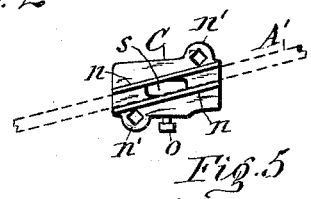
Figure 3:
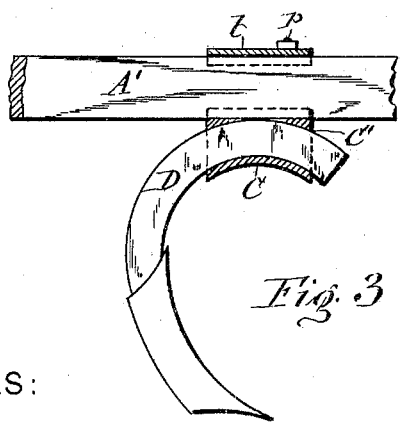
Figure 4:
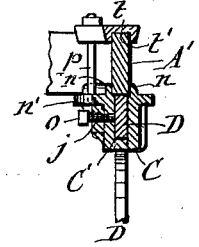
Figure 13:
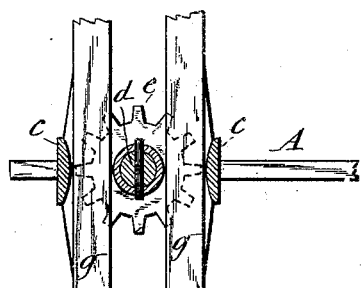
Figure 12:
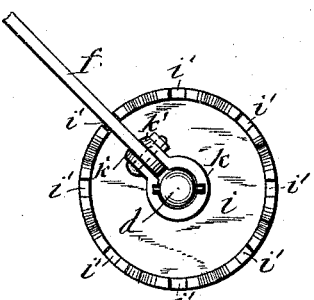
Figure 15:
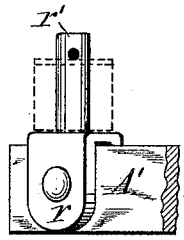
Figure 14:
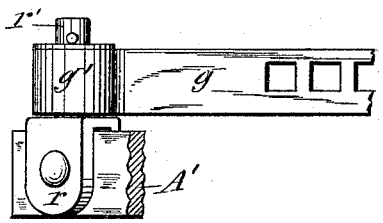
Figure 16:
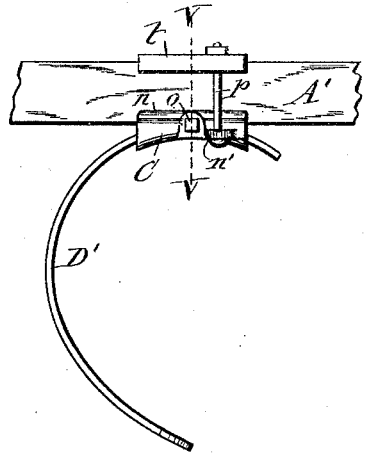
Figure 17:
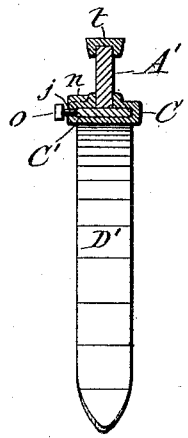

In the annexed drawings, Figure 1 is a perspective view of a cultivator embodying my improvements. Fig. 2 is an enlarged side view of the attachment of the cultivator-tooth. Fig. 3 is a vertical longitudinal section of the same. Fig. 4 is a transverse section on line $x$ $x$, Fig. 2. Fig. 5 is a detached top plan view of the attaching-shoe of the tooth. Fig. 6 is a side view of the attachment of a shovel-plate. Fig. 7 is a vertical longitudinal section of the same. Fig. 8 is a transverse section on line $y$ $y$, Fig. 6. Fig. 9 shows face views of the pivotal bearings of the swiveled tooth-attaching shoe. Fig. 10 is a side elevation of the devices for adjusting the side draft-bars of the frame. Fig. 11 is a vertical transverse section on line U U, Fig. 10. Fig. 12 is a top plan view of said devices. Fig. 13 is a transverse section on line $z$ $z$, Fig. 10. Fig. 14 is a side view of the connection of the rack to the side bar. Fig. 15 is a side view of the pivot of said connection. Fig. 16 is a side view of the attachment of a spring-tooth, and Fig. 17 is a transverse section on line V V, Fig. 16.

Similar letters of reference indicate corresponding parts.

A represents the central draft-bar, and A' A' the usual laterally-adjustable side draft-bars, which are hinged at their front ends to the central draft-bar, so as to allow said side bars to be set with their rear ends a greater or less distance apart, according to the width of the ground between the plants to be cultivated.

For the purpose of adjusting the side draft-bars A' A' as aforesaid I resort to the following devices: On the rear end portion of the central draft-bar A, I mount a plate $a$, which is formed with downward-projecting perforated ears $a'$ $a'$, which straddle the bar A, and a bolt or rivet passes transversely through said ears and intervening portion of the bar A, as shown in Figs. 10 and 11 of the drawings. The top of the plate $a$ is formed with a journal $b$ and with a yoke $c$, which rises from the plate at opposite sides of the journal and is provided with an eye $c'$, central over the journal $b$. The base of the yoke is formed with parallel guides $h$ $h$, for the purpose hereinafter explained. On the journal $b$ is mounted a pinion $e$, to which is rigidly secured a vertical shaft $d$, the upper end of which is journaled in and sustained by a brace I, attached to the handles H H. To said end of the shaft is firmly secured a crown-wheel $i$, the top of which is formed with notches $i'$ $i'$ or other suitable lever-holding bearings. Over this crown-wheel is a collar $k$, swiveled on the shaft $d$ and provided with perforated ears $k'$ $k'$, between which is secured the end of a lever $f$ by means of a bolt passing through said ears and the intervening end of the lever, which is adapted to enter either of the notches $i'$ and thus obtain a hold on the crown-wheel to turn thereby the shaft $d$. A cross-bar attached to the handles H H is formed with a catch $l$, which is adapted to receive the free end of the lever $f$ and confine the same in its position.

$g$ $g$ represent two racks, which are straight longitudinally and hinged or pivoted to the rear ends of the side draft-bars A' A', preferably by means of clips $r$ $r$, secured to the said side draft-bars and formed with upward-projecting gudgeons $r'$, as more fully shown in Fig. 15 of the drawings, the aforesaid racks being each provided at one end with a vertical eye $g'$, which is mounted on one of the aforesaid gudgeons, as illustrated in Fig. 4 of the drawings. The free ends of these racks pass through the guides $h$ $h$ on the central plate $a$ and engage the pinion $e$, as more clearly shown in Fig. 13 of the drawings. By turning the shaft $d$ the pinion $e$, being rotated with said shaft, causes the racks $g$ $g$ to be moved longitudinally in opposite directions from each other, and thus the side draft-bars A' A' are caused to move toward or from the central bar A, according to the direction in which the shaft $d$ is turned. By dropping the lever $f$ into the catch $l$ after the aforesaid adjustment is effected the side draft-bars A' A' are retained in their adjusted position.

For the attachment of the cultivator-tooth I employ a metallic shoe C, which is applied to the under side of the bar A' and formed with flanges $n$ $n$ on its top, by which flanges said shoe engages opposite sides of the bar. This shoe is secured to the side draft-bar A' by means of a clip-tie $t$, which is mounted on top of the bar and formed with a groove $t'$ in its under side, by which it is seated on the aforesaid bar.

The shoe C is formed with perforated ears $n'$ $n'$ on opposite sides of its top, and the clip-tie $t$ is formed with corresponding ears $t''$ $t''$, and bolts $p$ $p$ pass through the said ears and are provided with nuts by which to tighten the bolts, so as to securely retain the aforesaid shoe and clip-tie on the bar.

Longitudinally through the interior of the shoe C extends a channel C', which is curved in an arc of a circle in a vertical plane, as shown in Fig. 3 of the drawings, and in this channel is inserted the shank D of the tooth, which shank is curved likewise segmental or in the form of an arc of a circle and is adapted to be moved longitudinally in the said channel and thereby vary the pitch of the tooth, as represented by dotted lines in Fig. 2 of the drawings. The segmental form of the tooth-shank and its seat in the shoe permits the aforesaid adjustment without varying the depth from the bottom of the draft-bar A' to the point of the tooth. In the side of the shoe C is a screw-threaded eye $j$, in which is inserted a set-screw $o$. Said set-screw engages the tooth-shank within the shoe and confines the same in its adjusted position. By making the channel C' through the top portion of the shoe in such a position as to cause the said channel to extend through the top of the shoe central of the length thereof, as shown in Fig. 5 of the drawings, the tooth-shank D is brought to bear against the under side of the bar A', as shown in Figs. 3 and 4 of the drawings, and is thus more firmly secured in its position.

The cross-sectional shape of the channel C' can be varied to receive either a rigid tooth-shank D, which is rectangular in cross-section and disposed edgewise vertically, as represented in Figs. 2, 3, and 4 of the drawings, or a curved spring-tooth D', as illustrated in Figs. 16 and 17 of the drawings. In either case the shoe C consists of a single casting formed with arched channel C' through its interior, screw-threaded eye $j$ through its side, flanges $n$ $n$ on its top, and ears $n'$ $n'$ on opposite sides of its top. When the cultivator is equipped with shovel-plates, I form the said shoe with a horizontal plate C'' on its top and with an annular rib $u$ upon the top of said plate and with segmental slots $u'$ $u'$, concentric with the said rib, as shown in Fig. 9 of the drawings. Upon the plate C'', I mount a washer $v$, which is provided in its under side with the annular groove $v'$, into which enters the annular rib $u$, and thus forms a journal for the shoe C, said washer being seated on the under side of the bar A' and provided with the parallel flanges $n$ $n$, which embrace the opposite edges of the said bar, as shown in Fig. 8 of the drawings. Said washer is thus prevented from turning on the bar A'. The shoe C, with the washer $v$, is firmly secured to the bar A' by means of the clip-tie $t$, constructed and mounted on the top of the bar A' in the manner hereinbefore described, and by bolts $p$ $p$, passing vertically through the ears $t''$ $t''$ of the clip-tie and through apertures $v''$ $v''$ in the washer $v$ and through the segmental slots $u'$ in the top plate of the shoe, said slots allowing the shoe to be turned in a horizontal plane, so as to set the shank D at different angles to the line of draft, as may be desired, to bring the shovel-plate in its proper operative position, and by tightening the nuts on the bolts $p$ $p$ the shoe, with the shank D, is retained in its adjusted position.

It will be observed that by the described attachment of the shank D the adjustment of the shovel-plate is effected in a very convenient, expeditious, and accurate manner. It will also be observed that by my improved devices for attaching the tooth-shank to the frame I obviate the necessity of perforating the draft-bars, and at the same time obtain greater range and also greater accuracy of adjustment of the tooth, inasmuch as it can be shifted longitudinally on the frame to any suitable point thereof.

Having described my invention, what I claim as new, and desire to secure by Letters Patent, is—

1. In combination with the cultivator frame and tooth and its attaching-bolts, the shoe C, cast in one piece of metal with flanges n n, ears n' n', and channel C' and completely embracing the tooth-shank, substantially as set forth and shown.

2. The combination, with the cultivator-frame, of a shoe provided with a longitudinal seat for the draft-bar of the frame and with shoulders engaging opposite edges of said bar and also with a longitudinal channel through its interior, a clip securing said shoe to the frame, and the tooth having its shank extending through the channel of the shoe and secured therein, as set forth.

3. In combination with the frame and the tooth having its attaching-shank arched in a vertical plane, a shoe cast in one piece of metal secured to the under side of the frame and formed with a correspondingly-arched longitudinal channel for the reception of the aforesaid shank and having the central portion of the top of said channel extending through the top of the shoe to bring a portion of the tooth-shank to bear on the frame, and bolts clamping the shoe on the frame, as set forth.

4. In combination with the frame and the attaching-shank of the tooth, a shoe provided with a channel for the reception of said shank and formed with a horizontal plate on its top and with segmental slots in said plate, a washer seated upon said plate and on the under side of the draft-bar and provided with shoulders at opposite sides of said bar, a clip-tie seated upon the top of the draft-bar, and bolts connected to the clip-tie and passing through the segmental slots of the aforesaid plate and securing the same in its position, as specified.

5. In combination with the draft-bar and tooth-shank, the shoe C, formed with the channel C', top plate C'', annular rib u, and segmental slots u' u', the washer v, formed with the annular groove v' and apertures v'' v'', the clip-tie t, formed with the groove t' and ears t'' t'', and the bolts p p, passing through said ears and through the apertures of the washer and slots of the shoe-top plate, substantially as described and shown.

6. In combination with the frame, tooth-shank, and attaching clip and bolts, the metal shoe C, consisting of a single casting formed with the arched channel C' through its interior, screw-threaded eye J through its side, flanges n n on its top, and ears n' n' on opposite sides of its top, and the set-screw o in the eye j, substantially as described and shown.

7. In combination with the frame and tooth-shank, the metal shoe C, formed with the channel C', parallel flanges n n on its top, and ears n' n' on opposite sides of the top, the clip-tie t, formed with the groove t' in its under side and ears t'' t'' on opposite sides of the groove, and the bolts p p, passing through the ears of the clip-tie and of the shoe and provided with nuts for securing said parts to the frame, substantially as specified and shown.

8. A cultivator having the diagonal draft-bars A' A', formed straight longitudinally, the shoe C, seated movably longitudinally on the under side of the draft-bar and formed with shoulders or flanges n n, engaging opposite sides of said bar, and with the internal channel C' beneath the draft-bar and diagonal to the flanges, screw-threaded eye j through its side, and ears n' n' on its top, the tooth-shank passing through the channel C', the set-screw o in the eye, engaging the side of the draft-bar, the clip-tie t, formed with the groove t' and ears t'' t'', and bolts p p, passing through the aforesaid ears at opposite sides of the bar and securing the shoe to the frame, substantially as described and shown.

9. The combination, with the central bar A and adjustable side bars A' A', of the plate a, secured to the said central bar and formed with the journal b, yoke c, and guides h h, the pinion e, mounted on said journal, the shaft d, journaled in the yoke and secured to the pinion, the lever f, attached to said shaft, and the racks g g, extending from the side bars through the guides h h and engaging the pinion, substantially as described and shown.

10. In combination with the adjustable side bars A' A', racks g g, pinion e, and shaft d, the collar k, swiveled on said shaft and provided with ears k' k', the lever f, hinged to said ears, the crown-wheel i, fixed to the shaft and provided with notches i' i', and the catch l, adapted to confine the free end of the lever f, substantially as set forth and shown.

In testimony whereof I have hereunto signed my name this 21st day of February, 1891.

GEORGE B. DAVISON. [L. S.]

Witnesses:
EDWARD NORRIS,
ARTHUR E. COLE.